(12) United States Patent
Lin

(10) Patent No.: US 7,090,453 B2
(45) Date of Patent: Aug. 15, 2006

(54) SCREW

(76) Inventor: Teng-Hung Lin, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/022,408

(22) Filed: Dec. 27, 2004

(65) Prior Publication Data

US 2006/0140738 A1 Jun. 29, 2006

(51) Int. Cl.
*F16B 25/10* (2006.01)
*F16B 35/04* (2006.01)

(52) U.S. Cl. .................... 411/387.1; 411/412

(58) Field of Classification Search ........... 411/386, 411/411, 412, 413, 387.1, 387.2, 387.3, 387.4, 411/387.5, 387.6, 387.7, 387.8, 423, 417
See application file for complete search history.

(56) References Cited

U.S. PATENT DOCUMENTS

| | | | | |
|---|---|---|---|---|
| 413,968 A | * | 10/1889 | Rogers | 411/386 |
| 1,084,643 A | * | 1/1914 | Lasater | 411/399 |
| 1,651,796 A | * | 12/1927 | Arenz | 411/411 |
| 1,749,903 A | * | 3/1930 | Cannon | 411/413 |
| 1,802,668 A | * | 4/1931 | Newton | 411/412 |
| 2,263,137 A | * | 11/1941 | Oestereicher | 411/413 |
| 3,207,023 A | * | 9/1965 | Knohl | 411/387.3 |
| RE28,111 E | * | 8/1974 | Laverty | 411/412 |
| 3,942,405 A | * | 3/1976 | Wagner | 411/386 |
| 4,027,573 A | * | 6/1977 | Laverty | 411/413 |
| 4,241,638 A | * | 12/1980 | Shimizu et al. | 411/386 |
| 4,323,326 A | * | 4/1982 | Okada et al. | 411/412 |
| 4,329,099 A | * | 5/1982 | Shimizu et al. | 411/412 |
| 4,536,117 A | * | 8/1985 | Yamashiro | 411/411 |
| 4,655,661 A | * | 4/1987 | Brandt | 411/387.1 |
| 4,834,602 A | * | 5/1989 | Takasaki | 411/386 |
| 4,844,676 A | * | 7/1989 | Adamek | 411/386 |
| 4,874,278 A | * | 10/1989 | Kawashita | 411/386 |
| 5,015,134 A | * | 5/1991 | Gotoh | 411/386 |
| 5,061,136 A | * | 10/1991 | Dixon et al. | 411/412 |
| 5,282,708 A | * | 2/1994 | Giannuzzi | 411/386 |
| RE34,969 E | * | 6/1995 | Dixon et al. | 411/412 |
| 5,570,983 A | * | 11/1996 | Hollander | 411/386 |
| 5,957,646 A | * | 9/1999 | Giannuzzi et al. | 411/412 |
| 6,000,892 A | * | 12/1999 | Takasaki | 411/413 |
| 6,015,252 A | * | 1/2000 | Peck | 411/387.1 |
| 6,322,307 B1 | * | 11/2001 | Glover | 411/412 |
| 6,328,516 B1 | * | 12/2001 | Hettich | 411/387.2 |
| 6,616,391 B1 | * | 9/2003 | Druschel | 411/387.2 |
| 6,644,904 B1 | * | 11/2003 | Chen et al. | 411/387.2 |

(Continued)

OTHER PUBLICATIONS

NPL http://www.mcmaster.com . . . Catalogue "Drywall Screws".*

*Primary Examiner*—Robert J. Sandy
*Assistant Examiner*—Jeffrey A. Sharp

(57) ABSTRACT

A screw which can be more quickly screwed into a work piece and has better chip-exhausting effect. The screw has a rod body and higher thread and lower thread formed on the rod body. On a conic section of the screw, a cutting thread with another guide angle larger than the guide angle of the lower thread directly extends from the lower thread. Accordingly, the lower thread of the screw has better cuffing, drilling and chip-exhausting function. Alternatively, the screw can have single thread or double threads with equal height. On a predetermined section of the rod body of the screw, a cutting thread with changed guide angle is directly formed as a part of the thread to achieve better cutting, drilling and chip-exhausting function.

1 Claim, 2 Drawing Sheets

U.S. PATENT DOCUMENTS 6,739,815 B1 * 5/2004 Takasaki .................. 411/387.1
6,887,023 B1 * 5/2005 Lu et al. .................. 411/387.1
2003/0118423 A1 * 6/2003 Chen et al. .................. 411/386
2005/0069396 A1 * 3/2005 Wu ............................ 411/411

* cited by examiner

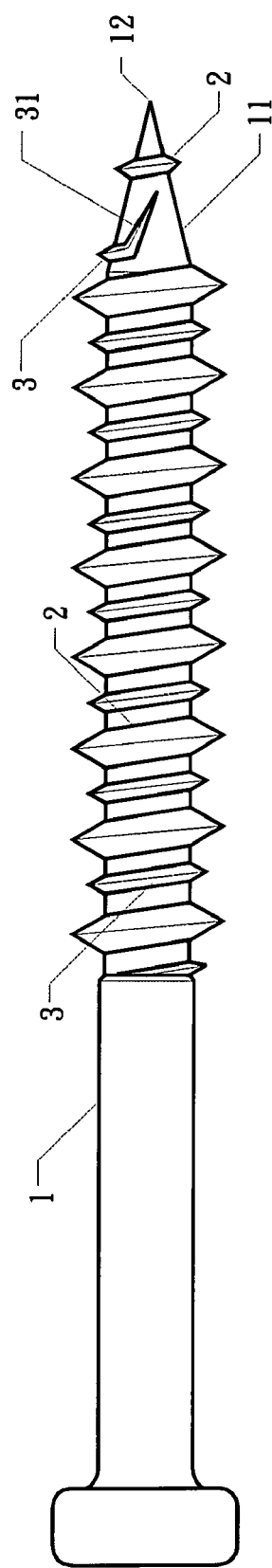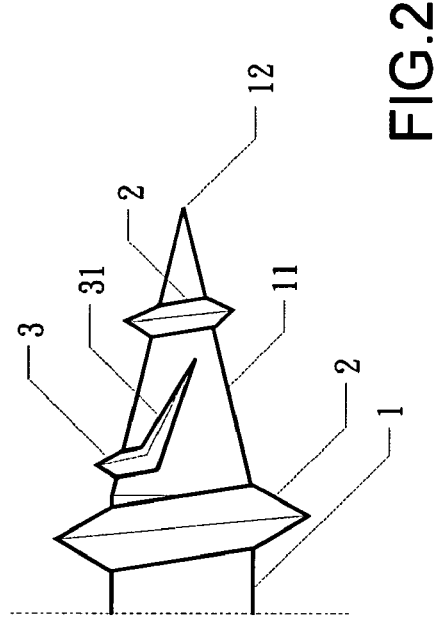
FIG.1
FIG.2

SCREW

BACKGROUND OF THE INVENTION

The present invention is related to an improved screw which can be more quickly screwed into a work piece and can more smoothly exhaust the chips of the work piece. The screw has a rod body and higher thread and lower thread formed on the rod body. Alternatively, the screw can have single thread or double threads with equal height. On a predetermined section of the rod body of the screw, a cutting thread with changed guide angle is directly formed as a part of the thread to achieve better cutting, drilling and chip-exhausting function.

Different types of screws have different structures according to the qualities of the work pieces in which the screws are screwed. However, with respect to all types of screws, it is required that the screws can be quickly firmly screwed into the work pieces with less strength. The screwing speed and the torque necessary for screwing the screw into the work piece are directly affected by whether the drilling chips of the work piece can be smoothly exhausted. In the case that the thread of the screw is designed with such a chip-exhausting structure as to smoothly exhaust the chips, the screw can be quickly screwed into the work piece with less torque. Reversely, the screw will encounter a greater resistance. As a result, the screw can be hardly quickly screwed into the work piece and the necessary torque is greater.

SUMMARY OF THE INVENTION

It is therefore a primary object of the present invention to provide an improved screw which can be more quickly screwed into a work piece and has better chip-exhausting effect. The screw has a rod body and higher thread and lower thread formed on the rod body. On a conic section of the screw, a cutting thread with another guide angle larger than the guide angle of the lower thread directly extends from the lower thread. Accordingly, the lower thread of the screw has better cutting, drilling and chip-exhausting function. Alternatively, the screw can have single thread or double threads with equal height. On a predetermined section of the rod body of the screw, a cutting thread with changed guide angle is directly formed as a part of the thread to achieve better cutting, drilling and chip-exhausting function.

The present invention can be best understood through the following description and accompanying drawings wherein:

BRIEF DESCRIPTION OF THE DRAWINGS

FIG. 1 is a perspective view of a first embodiment of the present invention;

FIG. 2 is an enlarged view of the conic section of the screw of the first embodiment according to FIG. 1;

DETAILED DESCRIPTION OF THE PREFERRED EMBODIMENTS

Figure 3:
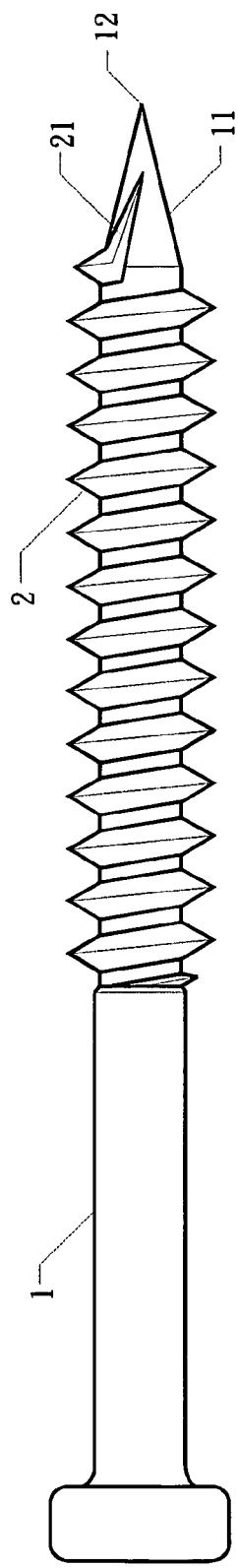
FIG. 3 is a perspective view of a second embodiment of the present invention.

Please refer to FIGS. 1 and 2. According to a first embodiment, the screw 1 of the present invention has a rod body and double threads. The double threads include higher thread 2 and lower thread 3 formed on the rod body.

On the conic section 11 of the screw 1, a cutting thread 31 with another guide angle directly extends from the lower thread 3 of the screw 1. The cutting thread 31 does not extend to the tip 12 of the screw 1. Accordingly, the lower thread of the screw 1 has cutting, drilling and chip-exhausting function. Therefore, the screw 1 with double threads not only has double anti-pull effects, but also has cutting, drilling and chip-exhausting function.

FIG. 3 shows a second embodiment of the present invention, in which the screw 1 has single thread 2. On the conic section 11 of the screw 1, a cutting thread 21 with changed guide angle directly extends from the thread 2 of the screw 1. The cutting thread 21 does not extend to the tip 12 of the screw 1. Accordingly, the screw 1 can be more easily screwed into a work piece with less torque. This is different from the conventional screw in which the cutting thread 21 extends to the tip 12 and which will encounter greater resistance when screwed into a work piece.

Figure 4:
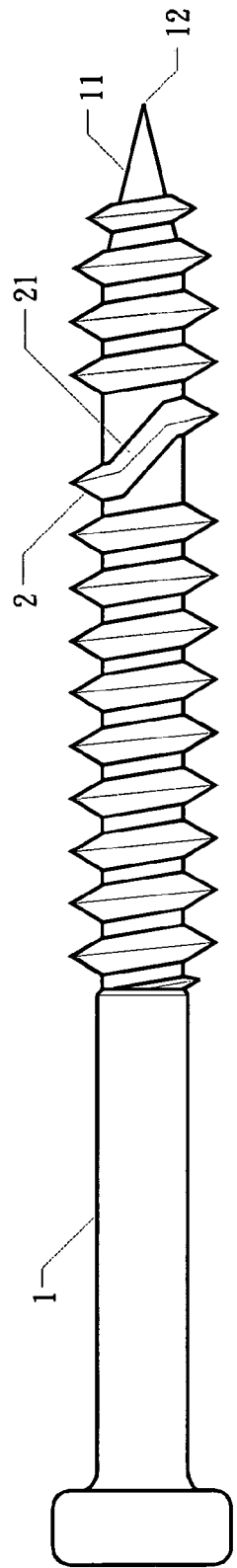
FIG. 4 is a perspective view of a third embodiment of the present invention.

FIG. 4 shows a third embodiment of the present invention, in which the screw 1 has single thread 2. On a predetermined section of the rod body of the screw 1, a cutting thread 21 with changed guide angle is directly formed as a part of the thread 2. The cutting thread 21 is formed on the rod body instead of the conic section 11 of the screw 1. Accordingly, after screwed into a work piece, the normal thread 2 in front of the cutting thread 21 can be tightly screwed in the work piece. Therefore, the anti-pull quality of the screw 1 as a whole is better than the conventional screw in which the cutting thread 21 is formed on the conic section 11 of the screw.

Figure 5:
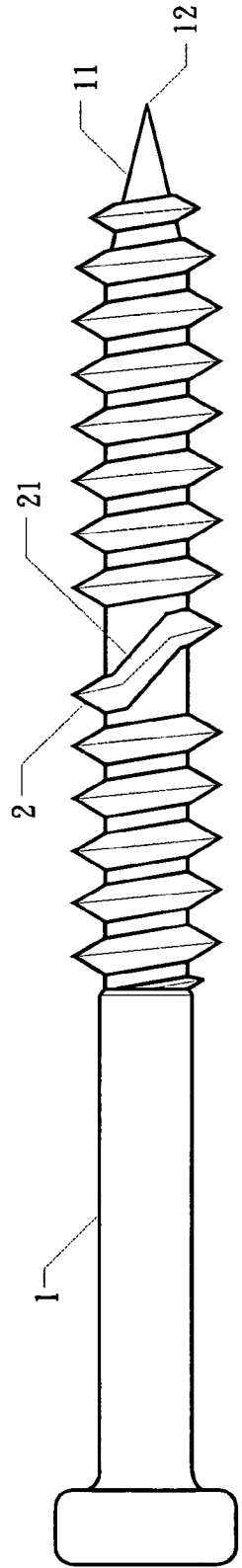
FIG. 5 is a perspective view of a fourth embodiment of the present invention.

FIG. 5 shows a fourth embodiment of the present invention, in which the screw 1 has double threads 2 with equal height. On a predetermined section of the rod body of the screw 1, a cutting thread 21 with changed guide angle is directly formed as a part of the double threads 2. The cutting thread 21 is formed on the rod body instead of the conic section 11 of the screw 1. Accordingly, after screwed into a work piece, the normal double threads 2 in front of the cutting thread 21 can be tightly screwed in the work piece. Therefore, the anti-pull quality of the screw 1 as a whole is better than the conventional screw in which the cutting thread 21 is formed on the conic section 11 of the screw.

According to the above arrangements, the present invention has the following advantages:

1. When screwed into a work piece, the screw of the present invention has better cutting, drilling and chip-exhausting function.
2. After screwed into a work piece, the screw of the present invention has better anti-pull quality.
3. The screw of the present invention has simple structure and better utility than the conventional screw.

The above embodiments are only used to illustrate the present invention, not intended to limit the scope thereof. Many modifications of the above embodiments can be made without departing from the spirit of the present invention.

What is claimed is:

1. A screw comprising:
    a rod body having a conic section; the conic section having a tip end;
    a higher thread formed on the rod body and the conic section; the higher thread having a distal end located on said conic section; and
    a lower thread formed on the rod body and the conic section; the lower thread being interposed between the higher thread from a lower end of the rod body to the tip end of the conic section; the lower thread having a smaller diameter than the higher thread and having a distal end located on said conic section; wherein said distal end of the lower thread sharply increases in pitch in a direction towards said tip end to form a general straight cutting tread which terminates at a location spaced from the tip end and spaced from the higher thread; and wherein the distal end of the higher thread extends closer to the tip end of the conic section than the distal end of the lower thread.

* * * * *